US009758423B2

(12) United States Patent
Cao et al.

(10) Patent No.: US 9,758,423 B2
(45) Date of Patent: Sep. 12, 2017

(54) GLASS FIBER COMPOSITION AND GLASS FIBER AND COMPOSITE MATERIAL THEREOF

(71) Applicant: JUSHI GROUP CO., LTD., Tongxiang (CN)

(72) Inventors: Guorong Cao, Tongxiang (CN); Wenzhong Xing, Tongxiang (CN); Lin Zhang, Tongxiang (CN); Guijiang Gu, Tongxiang (CN)

(73) Assignee: Jushi Group Co., Ltd., Tongxiang, Zhejiang (CN)

( * ) Notice: Subject to any disclaimer, the term of this patent is extended or adjusted under 35 U.S.C. 154(b) by 0 days.

(21) Appl. No.: 15/122,127

(22) PCT Filed: Jan. 20, 2015

(86) PCT No.: PCT/CN2015/071153

§ 371 (c)(1),
(2) Date: Aug. 26, 2016

(87) PCT Pub. No.: WO2015/131684

PCT Pub. Date: Sep. 11, 2015

(65) Prior Publication Data

US 2016/0362327 A1 Dec. 15, 2016

(51) Int. Cl.

*C03C 13/00* (2006.01)
*C03C 3/087* (2006.01)
*B32B 17/04* (2006.01)

(52) U.S. Cl.

CPC .............. *C03C 3/087* (2013.01); *B32B 17/04* (2013.01); *C03C 13/00* (2013.01)

(58) Field of Classification Search

CPC ......... C03C 3/087; C03C 13/00; B32B 17/06; B32B 17/04

See application file for complete search history.

(56) References Cited

U.S. PATENT DOCUMENTS

| | | | |
|---|---|---|---|
| 2001/0008864 A1 | 7/2001 | Tamura et al. | |
| 2009/0286440 A1 | 11/2009 | Lecomte et al. | |
| 2011/0039681 A1 | 2/2011 | Lecomte | |
| 2012/0135849 A1* | 5/2012 | Hoffman ................. | C03C 3/087 501/38 |

FOREIGN PATENT DOCUMENTS

| | | |
|---|---|---|
| CN | 101119939 | 2/2008 |
| CN | 102015563 | 4/2011 |
| CN | 102390934 | 3/2012 |
| CN | 103351102 | 10/2013 |
| WO | 9816482 | 4/1998 |

OTHER PUBLICATIONS

International Search Report for PCT/CN2015/071153 dated Oct. 21, 2015and its English translation provided by WIPO.

Written Opinion of the International Search Authority for PCT/CN2015/071153 dated Oct. 21, 2015and its English translation provided by Google Translate.

* cited by examiner

*Primary Examiner* — Elizabeth A Bolden

(74) *Attorney, Agent, or Firm* — Ladas & Parry, LLP

(57) ABSTRACT

The present invention provides a glass fiber composition, a glass fiber and a composite material therefrom. The glass fiber composition comprises the following components expressed as percentage by weight: 58-64% SiO2, 14-19% Al203, ≥8.8% and <11.8% CaO, 7.5-11% MgO, 0.2-2.7% SrO, 0.1-2% Na2O+K2O, 0.05-0.9% Li2O, 0.05-1% Fe2O3, 0.05-1.1% TiO2 and <0.5% F2, wherein the range of the weight percentage ratio C1=(MgO+SrO)/CaO is 0.75-1.1, and the range of the weight percentage ratio C2=CaO/MgO is less than 1.4. Said composition can effectively inhibit the crystallization tendency of glass, significantly decrease the liquidus temperature and crystallization degree of glass and also has an outstanding glass refractive index and outstanding modulus.

19 Claims, No Drawings

GLASS FIBER COMPOSITION AND GLASS FIBER AND COMPOSITE MATERIAL THEREOF

CROSS-REFERENCE TO RELATED APPLICATION

This is the U.S. national phase of PCT Application No. PCT/CN2015/071153 filed on Jan. 20, 2015 and entitled "GLASS FIBER COMPOSITION AND GLASS FIBER AND COMPOSITE MATERIAL THEREOF", the disclosure of which is incorporated herein by reference in its entirety.

FIELD OF THE INVENTION

The present invention relates to a type of glass fiber composition, specifically to a composition for a high performance glass fiber used as a reinforcing base material for advanced composite materials, and a glass fiber and a composite material therefrom.

BACKGROUND OF THE INVENTION

Glass fiber is an inorganic fiber material and can be used to reinforce resins to produce composite materials with good performance. As a reinforcing base material for advanced composite materials, high-performance glass fibers were originally used mainly in the aerospace industry or the national defense industry. With the progress of science and technology and the development of economy, high-performance glass fibers have been widely used in civil and industrial fields such as motors, wind blades, pressure vessels, offshore oil pipes, sports apparatus and auto industry.

Since the American company developed S-2 glass fiber, different countries have developed high-performance glass fibers with various compositions, e.g. R glass fiber developed by a French company, HiPer-tex glass fiber developed by an American company and high-strength glass fiber #2 developed by a Chinese company. The original high-performance glass compositions were based on an MgO—$Al_2O_3$—$SiO_2$ system and a typical solution was S-2 glass of an American company. However, the production of S-2 glass is excessively difficult, as its forming temperature is up to about 1571° C. and its liquidus temperature up to 1470° C. and therefore it is difficult to realize large-scale industrial production.

Thereafter, in order to decrease the melting temperature and forming temperature of glass to better satisfy the needs of large-scale production with refractory-lined furnaces, large companies successively developed high-performance glasses based on an MgO—CaO—$Al_2O_3$—$SiO_2$ system. Typical solutions were R glass of French company and HiPer-tex glass of American company, which were a tradeoff for production scale by sacrificing some of the glass properties. However, as these designed solutions were too conservative, especially the content of $Al_2O_3$ was kept more than 20%, preferably 25%, the production of glass remained highly difficult. Although small-scale production with refractory-lined furnace was achieved, the production efficiency was low and the cost performance ratio of the products was not high. The traditional R glass is difficult to fiberized as its forming temperature is up to about 1410° C. and its liquidus temperature up to 1330° C., which causes difficulty in attenuating glass fiber and consequently in realizing large-scale industrial production.

In addition, there is another type of R glass, of which the mechanical properties are slightly lower than those of the traditional R glass and its melting and forming properties are significantly superior to those of the traditional R glass. However, as its ratio of calcium to magnesium is quite high. The glass has a high risk for crystallization (devitrification). In addition, since too much $Li_2O$ is introduced, not only the chemical stability of the glass is affected, but also its raw material cost is higher. Therefore it is also not suitable for large-scale industrial production.

The High-strength 2# glass fiber mainly comprises $SiO_2$, $Al_2O_3$ and MgO, and certain amounts of $Li_2O$, $B_2O_3$, $CeO_2$ and $Fe_2O_3$ are also introduced. It also has high strength and high modulus and its forming temperature is only about 1245° C. and its liquidus temperature is 1320° C. Both temperatures are much lower than those of S glass fiber. However, since its forming temperature is lower than its liquidus temperature, which is unfavorable for the control of glass fiber attenuation. Its forming temperature has to be increased and specially-shaped tips have to be used to prevent a glass crystallization phenomenon from occurring in the fiber attenuation process. This causes difficulty in temperature control and also makes it difficult to realize large-scale industrial production.

To sum up, we find that, at present stage, in the actual production of various high-performance glass fibers lies a common issue which is that the liquidus temperature of glass is too high and the crystallization risk is great, At present, the liquidus temperature of the mainstream E glass is generally lower than 1200° C., while the liquidus temperature of above-mentioned high-performance glasses is generally higher than 1300° C., which will cause the glass crystallization phenomenon to occur easily during the production process. As a result, the production efficiency of glass fibers and the service life of refractory materials and platinum bushings are greatly reduced.

SUMMARY OF THE INVENTION

The present invention aims to solve the issue described above. The purpose of the present invention is to provide a high-performance glass fiber composition which not only ensures that the glass fiber has high mechanical properties and low forming temperature, but also overcomes the issue of too high liquidus temperature and too high rate of crystallization in traditional high-performance glasses which lead to high tendency to crystallization and difficulty to achieve large-scale high-efficiency production, significantly decreases the liquidus temperature of high performance glass, increases the glass crystallization peak temperature, decreases the degree of glass crystallization under the same conditions and, meanwhile, has an outstanding glass refractive index which greatly improves transparency of glass fiber-reinforced articles.

According to one aspect of the present invention, the present invention provides a glass fiber composition wherein the glass fiber composition comprises the following components expressed as percentage by weight:

| | |
|---|---|
| $SiO_2$ | 58-64% |
| $Al_2O_3$ | 14-19% |
| CaO | ≥8.8% and <11.8% |
| MgO | 7.5-11% |
| SrO | 0.2-2.7% |
| $Na_2O + K_2O$ | 0.1-2% |
| $Li_2O$ | 0.05-0.9% |

-continued

| | |
|---|---|
| $Fe_2O_3$ | 0.05-1% |
| $TiO_2$ | 0.05-1.1% |
| $F_2$ | <0.5% |

Wherein, the range of the weight percentage ratio C1 ((MgO+SrO)/CaO is 0.75-1.1, and the range of the weight percentage ratio C2=CaO/MgO is less than 1.4.

Wherein, the range of the weight percentage ratio C2=CaO/MgO is greater than 1 and less than 1.3.

Wherein, the range of the weight percentage ratio C1=(MgO+SrO)/CaO is 0.8-1.

Wherein, the content of CaO by weight percentage is greater than 10.5% and less than 11.8%.

Wherein, the composition comprises the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

Wherein, the range of the weight percentage ratio C1=(MgO+SrO)/CaO is 0.75-1.1, and the range of the weight percentage ratio C2=CaO/MgO is less than 1.4.

Wherein, the composition comprises the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

Wherein, the range of the weight percentage ratio C1=(MgO+SrO)/CaO is 0.8-1, and the range of the weight percentage ratio C2=CaO/MgO is greater than 1 and less than 1.3.

Wherein, the composition comprises the following components expressed as percentage by weight:

| | |
|---|---|
| $SiO_2$ | 59-61.5% |
| $Al_2O_3$ | 14.5-16.5% |
| CaO | 10.6-11.7% |
| MgO | 8-10% |
| SrO | 0.5-2% |
| $Na_2O + K_2O$ | 0.1-1% |
| $Li_2O$ | 0.05-0.7% |
| $Fe_2O_3$ | 0.05-0.7% |
| $TiO_2$ | 0.05-0.8% |
| $F_2$ | <0.5% |

Wherein, the range of the weight percentage ratio C1=(MgO+SrO)/CaO is 0.8-1, and the range of the weight percentage ratio C2=CaO/MgO is greater than 1 and less than 1.3.

According to another aspect of the invention, a glass fiber produced with said glass fiber composition is provided.

According to yet another aspect of the invention, a composite material incorporating said glass fiber is provided.

By introducing appropriate amounts of SrO and $Li_2O$, reasonably configuring the content ranges of CaO, MgO and SrO and the ranges of the (MgO+SrO)/CaO and CaO/MgO ratios, and utilizing the CaO, MgO and SrO ternary mixed alkali earth effect, the glass fiber composition of the present invention not only ensures that the glass fiber has high mechanical properties and low forming temperature, but also overcomes the issue of too high liquidus temperature and too high rate of crystallization in traditional high-performance glasses which lead to high tendency to crystallization and difficulty to achieve large-scale high-efficiency production, significantly decreases the liquidus temperature of high performance glass, increases the glass crystallization peak temperature, decreases the degree of glass crystallization under the same conditions and, meanwhile, has an outstanding glass refractive index which greatly improves the transparency of glass fiber-reinforced articles. Specifically, the glass fiber composition according to the present invention comprises the following components expressed as percentage by weight:

| | |
|---|---|
| $SiO_2$ | 58-64% |
| $Al_2O_3$ | 14-19% |
| CaO | ≥8.8% and <11.8% |
| MgO | 7.5-11% |
| SrO | 0.2-2.7% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

Wherein, the range of the weight percentage ratio C1=(MgO+SrO)/CaO is 0.75-1.1, and the range of the weight percentage ratio C2=CaO/MgO is less than 1.4.

The effect and content of each component in said glass fiber composition is described as follows:

SiO2 is a main oxide forming the glass network and has the effect of stabilizing all the components. In the glass fiber composition of the present invention, the restricted content range of $SiO_2$ is 58-64%. Too low of a content will affect the mechanical properties of the glass; too high of a content will cause the glass viscosity to be excessively high thereby resulting in melting and fining issues. Preferably, the $SiO_2$ content range can be 59-62%. More preferably, the $SiO_2$ content range can be 59-61.5%.

$Al_2O_3$ is another main oxide forming the glass network. When combined with $SiO_2$, it can have a substantive effect on the mechanical properties of the glass and a significant effect on preventing glass phase separation and on water resistance. The restricted content range of $Al_2O_3$ in this invention is 14-19%. Too low of a content will make it impossible to obtain sufficiently high mechanical properties, especially modulus; too high of a content will cause the glass viscosity to excessively high thereby resulting in melting and fining issues. Preferably, the $Al_2O_3$content can be 14.5-18%. More preferably, the $Al_2O_3$content can be 14.5-16.5%.

In the present invention, CaO, MgO and SrO primarily have the effect of controlling the glass crystallization and regulating the glass viscosity and the rate of hardening of molten glass, Particularly on the control of the glass crystallization, the inventors have obtained unexpected effects by controlling the introduced amounts of them and the ratios between them. Generally, for a high-performance glass based on the MgO—CaO—$Al_2O_3$—$SiO_2$ system, the crystal phases it contains after glass crystallization include mainly diopside ($CaMgSi_2O_6$) and anorthite ($CaAl_2Si_2O_3$). In order to effectively inhibit the tendency for two crystal phases to crystallize and decrease the upper limit temperature of the glass crystallization (liquidus temperature) and the degree of crystallization, two technical means or a combination of them can be used in the present invention: on the one hand, by adding an appropriate amount of SrO and rationally controlling the ratio range of (MgO+SrO)/CaO to form a more compact stacking structure through the ternary mixed alkali earth effect, the liquidus temperature can be decreased and the peak crystallization temperatures of the two crystal phases can be increased so that more energy is needed for crystal nucleuses to form and grow, thereby achieving the objective of simultaneously inhibiting the tendency for the two crystal phases to crystallize; on the another hand, by rationally controlling the ratio range of CaO/MgO and decreasing the molar ratio of $Ca^{2+}/Mg^{2+}$ ions, an obvious shortage of $Ca^{2+}$ ions will result during the crystallization process of the two crystal phases, thereby achieving the objective of simultaneously inhibiting the tendency for the two crystal phases to crystallize and decreasing the liquidus temperature. In addition, what is surprising to the inventors is that, the overall technical effect produced when both technical means are used simultaneously, is noticeably bigger than the accumulative effect produced when the two technical means are used separately.

Firstly, the first technical means is explained as below. A great amount of experiments and researches have demonstrated that, when their ratios are rational, the technical effect of the CaO, MgO and SrO ternary mixed alkali earth effect is noticeably better than that of the CaO and MgO binary mixed alkali earth effect. This is because, as more alkali earth metal ions with different radius participate in the replacement process, a compact stacking structure forms more easily and thereby the glass has better crystallization, mechanical and optical properties. In addition, our research shows, from the perspective of simple replacement, compared with CaO, SrO can better improve the compressive strength and refractive index of the glass and the difference in their effect on the rate of hardening of molten glass is big; compared with MgO, SrO can be improve the tensile strength, elastic modulus and refractive index of the glass and the difference in their effect on the rate of hardening of molten glass is small. In addition, compared with CaO, MgO can better improve the elastic modulus of glass and the difference in their effect on the rate of hardening of molten glass is big. At the same time, considering the matching between the sizes of ions, it is appropriate to control the ratio of the sum of SrO and MgO to CaO. Since the ionic radiuses of Mg2+, Ca2+ and Sr2+ sequentially become bigger and their ion field strengths sequentially become smaller, in order to achieve a compact stacking structure, the matching between the numbers of three types of ions becomes very important. What is particularly noteworthy is that, an appropriate amount of SrO is introduced in the glass fiber composition of the present invention, and, by way of a rationally adjusted ratio of (MgO+SrO)/CaO, the tendency and degree of the glass crystallization can be effectively controlled.

In principle, crystallization is a process of formation and continuous growth of crystal nucleuses, i.e., a process of movement and restructuring of various atoms in glass. The ternary alkali earth system designed in the present invention makes it easier to achieve a compact stacking structure of the glass. At the same time, since the ionic radius of $Sr^{2+}$ is bigger, not only it is difficult for $Sr^{2+}$ ions themselves to move, but also they can effectively impede the movement and restructuring of $Mg^{2+}$ and $Ca^{2+}$ ions under the same conditions, thereby achieving the objective of inhibiting the crystallization tendency and reducing the crystallization rate. Therefore, from the glass fiber composition of the present invention an even better crystallization performance can be obtained.

The present invention comprehensively considers the CaO, MgO and SrO ternary mixed alkali earth effect and selects an appropriate SrO content to be able to achieve a lower upper limit temperature and lower degree of crystallization, higher mechanical properties and higher glass refractive index. However, as the molecular weight of strontium oxide is relatively high, an excessive addition of strontium oxide will lead to an increase of the glass density, which will have a negative impact on the specific strength and specific modulus of glass fiber. Therefore, in the present invention, the restricted SrO content range is 0.2-2.7%, the CaO content range is ≥8.8% and <11.8%, the MgO content range is 7.5-11% and the range of the weight percentage ratio C1=(MgO+SrO)/CaO is 0.75-1.1. Preferably, the SrO content range is 0.5-2%, the CaO content range is >10.5% and <11.8%, the MgO content range is 8-10.5% and the range of the weight percentage ratio C1=(MgO+SrO)/CaO is 0.8-1. More preferably, the CaO content range is 10.6-11.7% and the MgO content range MgO is 8-10%.

Now the second technical means is explained as below. For a high-performance glass based on an MgO—CaO—$Al_2O_3$—$SiO_2$ system, the crystal phases it contains after the glass crystallization include mainly diopside ($CaMgSi_2O_6$) and anorthite ($CaAl_2Si_2O_3$). The molar ratio of $Ca^{2+}/Mg^{2+}$ in the molecular formula of diopside is 1. Sufficient amounts of both $Ca^{2+}$ and $Mg^{2+}$ are needed for diopside crystals to grow completely and rapidly. Similarly, anorthite crystals need a $Ca^{2+}$ rich environment to be able to grow rapidly. In the present invention, the weight percentage ratio C2=CaO/MgO is introduced to measure and control the $Ca^{2+}/Mg^{2+}$ molar ratio in order to inhibit the growth of two crystal phases simultaneously. The inventors have found that the CaO/MgO ratio in traditional high-performance glasses is often relatively high, generally greater than 1.6 and even greater than 2, which translate approximately to a $Ca^{2+}/Mg^{2+}$ molar ratio of greater than 1.14 and 1.42 (accurate to two decimal places) respectively. In such case, since the amount of $Ca^{2+}$ and $Mg^{2+}$ ions is sufficient for complete and rapid growth of the crystal phases, the growth of the two crystal phases cannot be inhibited simultaneously, even though there is a change in the ratio of the two crystal phases in the final crystallization products.

With further research, the inventors have unexpected found that, in the glass fiber composition of the present invention, when the CaO/MgO ratio is controlled to be less than 1.4, especially less than 1.3, which translate approximately to a $Ca^{2+}/Mg^{2+}$ molar ratios of less than 1 and 0.92 respectively, compared with the CaO/MgO ratio of greater than 1.6 or 2 in the traditional high-performance glasses, the glass liquidus temperature and the degree of crystallization are significantly decreased. The significant decrease of the degree of crystallization of crystal phases is manifested by a noticeable decrease in the intensity of X-ray diffraction peaks. At the same time, the SEM pictures show that the crystal grains of diopside change from a columnar or rod-like shape to a long and thin needle-like shape and the crystal grains become smaller and their completeness declines. The inventors believe that this is mainly because that, as the CaO/MgO ratio decreases such that the molar ratio of $Ca^{2+}/Mg^{2+}$ in the glass is below the theoretical $Ca^{2+}/Mg^{2+}$ molar ratio 1 needed for the formation of diopside, duo to a shortage of $Ca^{2+}$ ions for complete crystallization, the crystallization processes of both diopside and anorthite are significantly affected, hereby achieving the effect of simultaneously inhibiting the crystallization tendency of the two crystal phases. At the same time, with the decrease of the CaO/MgO ratio, since the molecular weight of MgO is lower than that of CaO, when MgO is used to replace CaO of the same mass, the oxygen provided by MgO is much more than that by CaO, which helps more aluminum ions to form tetrahedral coordination, strengthen the network of the glass system and further reduce the crystallization tendency. However, the CaO/MgO ratio should not be too low, otherwise there will be a large surplus of magnesium ions, which will increase to a certain extent the crystallization tendency of a new crystal phase—forsterite ($Mg_2Si_2O_6$). Therefore, preferably, the CaO/MgO ratio is above 1 and below 1.3.

The inventors believe that, in the glass fiber composition of the present invention, by jointly using the foregoing two technical means, especially by keeping the SrO content range at 0.5-2%, the CaO content range at >10.5% and <11.8%, the MgO content range at 8-10.5%, the range of the weight percentage ratio C1=(MgO+SrO)/CaO at 0.8-1 and the range of the weight percentage ratio C2=CaO/MgO at >1 and <1.3, the ion stacking among the ternary alkali earth oxides become exceptionally compact and the glass structure become particularly stable; in the meantime, the impedance of $Sr^{2+}$ions and the lack of $Ca^{2+}$ions will further inhibit the crystallization tendency of the two crystal phases and thereby the glass has significantly decreased liquidus temperature and crystallization degree. Compared with the traditional high-performance glasses, such technical effects were unexpected.

Both $K_2O$ and $Na_2O$ can reduce glass viscosity and are good fluxing agents. Replacing $Na_2O$ with $K_2O$ while keeping the total amount of alkali metal oxides unchanged can reduce the crystallization tendency of glass, improve the fiberizing performance; and also reduce the surface tension of molten glass and improve the glass melting performance. In the glass fiber composition of the present invention, the restricted content range of $Na_2O+K_2O$ is 0.1-2%. Preferably, the content range of $Na_2O+K_2O$ is 0.1-1%.

$Fe_2O_3$ facilitates the melting of glass and can also improve the crystallization performance of glass. However, since ferric ions and ferrous ions have a coloring effect, the introduced amount should be limited. Therefore, in the glass fiber composition of the present invention, the restricted content range of $Fe_2O_3$ is 0.05-1%. Preferably, the content range of $Fe_2O_3$ is 0.05-0.7%.

$TiO_2$ can not only reduce the glass viscosity at high temperature, but also has a certain fluxing effect. However, since titanium ions have a certain coloring effect and such coloring effect becomes particularly significant when the $TiO_2$ content exceeds 1.1%, this will affect the appearance of glass fiber-reinforced articles to some extent. Therefore, in the glass fiber composition of the present invention, the restricted content range of $TiO_2$ is 0.05-1.1%. Preferably, the content range of $TiO_2$ is 0.05-0.8%.

Compared with $Na_2O$ and $K_2O$, $Li_2O$ can not only significantly reduce glass viscosity thereby improving the glass melting performance, but also help greatly improve the mechanical properties of glass. In addition, a small amount of $Li_2O$ provides considerable free oxygen, which helps more aluminum ions to form tetrahedral coordination, enhances the network structure of the glass system and further reduces the crystallization tendency of glass. Due to the high cost of $Li_2O$, the introduced amount should be limited. Therefore, in the glass fiber composition of the present invention, the restricted content range of $Li_2O$ is 0.05-0.9%. Preferably, the content range of $Li_2O$ is 0.05-0.7%.

In addition, the glass fiber composition of the present invention allows the existence of a small amount of fluorine ($F_2$). The restricted content range of $F_2$ is less than 0.5%. However, considering the great negative impact of fluorine on environment, normally it is not intentionally added.

In the glass fiber composition of the present invention, the beneficial effects produced by the aforementioned selected ranges of the components will be explained through the specific experimental data given in the examples provided below.

The following are examples of preferred content ranges of the components contained in the glass fiber composition according to the present invention.

PREFERRED EXAMPLE 1

The glass fiber composition according to the present invention comprises the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

Wherein, the range of the weight percentage ratio C1=(MgO+SrO)/CaO is 0.75-1.1, and the range of the weight percentage ratio C2=CaO/MgO is less than 1.4.

PREFERRED EXAMPLE 2

The glass fiber composition according to the present invention contains the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

Wherein, the range of the weight percentage ratio C1=(MgO+SrO)/CaO is 0.8-1, and the range of the weight percentage ratio C2=CaO/MgO is greater than 1 and less than 1.3.

PREFERRED EXAMPLE 3

The glass fiber composition according to the present invention contains the following components expressed as percentage by weight:

| | |
|---|---|
| $SiO_2$ | 59-61.5% |
| $Al2O_3$ | 14.5-16.5% |
| CaO | 10.6-11.7% |
| MgO | 8-10% |
| SrO | 0.5-2% |
| $Na2O + K_2O$ | 0.1-1% |
| $Li_2O$ | 0.05-0.7% |
| $Fe2O_3$ | 0.05-0.7% |
| $TiO_2$ | 0.05-0.8% |
| $F_2$ | <0.5% |

Wherein, the range of the weight percentage ratio C1=(MgO+SrO)/CaO is 0.8-1, and the range of the weight percentage ratio C2=CaO/MgO is greater than 1 and less than 1.3.

Meanwhile, the glass obtained according to the composition in the preferred example 3 has outstanding mechanical properties. Generally, its Young's modulus is greater than 84 GPa and less than 91.5 GPa. When estimated based on glass density, generally its specific Young's modulus is greater than 32 MPa/(kg/m$^3$) and less than 35.5 MPa/(kg/m$^3$).

DETAILED DESCRIPTION AND EMBODIMENTS OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the glass fiber composition expressed as percentage by weight are: 58-64% $SiO_2$, 14-19% $Al_2O_3$, ≥8.8% and <11.8% CaO, 7.5-11% MgO, 0.2-2.7% SrO, 0.1-2% $Na_2O$+$K_2O$, 0.05-0.9% $Li_2O$, 0.05-1% $Fe_2O_3$, 0.05-1.1% $TiO_2$ and <0.5% $F_2$, wherein the range of the weight percentage ratio C1=(MgO+SrO)/CaO is 0.75-1.1 and the range of the weight percentage ratio C2=CaO/MgO is less than, 1.4. Preferably, the range of the weight percentage ratio C2=CaO/MgO can be further defined to be greater than 1 and less than 1.3. The glass fiber composition according to the present invention can overcome the issue of too high liquidus temperature and too high rate of crystallization in traditional high-performance glasses which lead to high tendency to crystallization and difficulty to achieve large-scale high-efficiency production, significantly decreases the liquidus temperature of high performance glass, increases the glass crystallization peak temperature, decreases the degree of glass crystallization under the same conditions and, meanwhile, has an outstanding glass refractive index which greatly improves transparency of glass fiber-reinforced articles.

The specific content values of $SiO_2$, $Al_2O_3$, CaO, MgO, SrO, $Na_2O$, $K_2O$, $Fe_2O_3$, $Li_2O$ and $TiO_2$ in the glass fiber composition of the present invention are selected to be used in the examples and comparisons with boron-free E glass, traditional R glass and improved R glass are made in terms of the following six property parameters, (1) Forming temperature, the temperature at which the glass melt has a viscosity of $10^3$ poise.

(2) Liquidus temperature, the temperature at which the crystal nucleuses begin to form when the glass melt cools off—i.e., the upper limit temperature for glass crystallization.

(3) ΔT value, which is the difference between the forming temperature and the liquidus temperature and indicates the temperature range at which fiber drawing can be performed.

(4) Peak crystallization temperature, the temperature which corresponds to the strongest peak of glass crystallization during the DTA testing. Generally, the higher this temperature is, the more energy is needed by crystal nucleuses to grow and the lower the glass crystallization tendency is.

(5) Refractive index, the ratio of the speed of light in air and the speed of light in glass.

(6) Young's modulus, the linear elastic modulus which define the ability of glass to resist elastic deformation.

The aforementioned six parameters and the methods of measuring them are well-known to one skilled in the art. Therefore, the aforementioned parameters can be effectively used to explain the properties of the glass fiber composition of the present invention. In addition, the inventors also employ an X-ray diffractometer and a scanning electron microscope to observe the type, appearance and crystallization status of crystal phases.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fiber. The glass fiber is attenuated onto the rotary collet of a winder to form cakes or packages. Of course, conventional methods can be used to deep process these glass fibers to meet the expected requirements.

The exemplary embodiments of the glass fiber composition according to the present invention are given below.

EXAMPLE 1

| | |
|---|---|
| $SiO_2$ | 60.5% |
| $Al_2O_3$ | 15.5% |
| CaO | 11.4% |
| MgO | 9.1% |
| SrO | 1.3% |
| $Li_2O$ | 0.5% |
| $Na_2O$ | 0.21% |
| $K_2O$ | 0.62% |
| $Fe_2O_3$ | 0.42% |
| $TiO_2$ | 0.35% |

Wherein, the weight percentage ratio C1=(MgO+SrO)/CaO is 0.91, and the weight percentage ratio C2=CaO/MgO is 1.25.

In Example 1, the measured values of the six parameters are respectively:

| | |
|---|---|
| Forming temperature | 1274° C. |
| Liquidus temperature | 1192° C. |
| ΔT | 82° C. |
| Peak crystallization temperature | 1034° C. |
| Refractive index | 1.569 |
| Young's modulus | 89.3 GPa |

EXAMPLE 2

| | |
|---|---|
| $SiO_2$ | 61.0% |
| $Al_2O_3$ | 16.0% |
| CaO | 11.4% |
| MgO | 8.95% |
| SrO | 0.5% |
| $Li_2O$ | 0.55% |
| $Na_2O$ | 0.24% |
| $K_2O$ | 0.54% |
| $Fe_2O_3$ | 0.42% |
| $TiO_2$ | 0.3% |

Wherein, the weight percentage ratio C1=(MgO+SrO)/CaO is 0.82, and the weight percentage ratio C2=CaO/MgO is 1.27.

In Example 2, the measured values of the six parameters are respectively:

| | |
|---|---|
| Forming temperature | 1276° C. |
| Liquidus temperature | 1194° C. |
| ΔT | 82° C. |
| Peak crystallization temperature | 1026° C. |
| Refractive index | 1.568 |
| Young's modulus | 90 GPa |

EXAMPLE 3

| | |
|---|---|
| $SiO_2$ | 60.2% |
| $Al_2O_3$ | 15.55% |
| CaO | 11.0% |
| MgO | 9.0% |
| SrO | 2.0% |
| $Li_2O$ | 0.55% |
| $Na_2O$ | 0.24% |
| $K_2O$ | 0.54% |
| $Fe_2O_3$ | 0.42% |
| $TiO_2$ | 0.4% |

Wherein, the weight percentage ratio C1=(MgO+SrO)/CaO is 1.0, and the weight percentage ratio C2=CaO/MgO is 1.22.

In example 3, the measured values of the six parameters are respectively:

| | |
|---|---|
| Forming temperature | 1279° C. |
| Liquidus temperature | 1190° C. |
| ΔT | 89° C. |
| Peak crystallization temperature | 1039° C. |
| Refractive index | 1.570 |
| Young's modulus | 89.5 GPa |

Comparisons of the property parameters of the aforementioned examples and other examples of the glass fiber composition of the present invention with those of the boron-free E glass, traditional R glass and improved R glass are further made below by way of tables, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1

| | | A1 | A2 | A3 | A4 | A5 | A6 | A7 |
|---|---|---|---|---|---|---|---|---|
| Component | $SiO_2$ | 60.5 | 61.0 | 60.2 | 59.5 | 61.5 | 60.5 | 59.8 |
| | $Al_2O_3$ | 15.5 | 16.0 | 15.55 | 15.8 | 15.3 | 15.7 | 15.5 |
| | CaO | 11.4 | 11.4 | 11.0 | 11.5 | 11.7 | 11.6 | 10.6 |
| | MgO | 9.1 | 8.95 | 9.0 | 8.4 | 9.2 | 9.0 | 9.1 |
| | SrO | 1.3 | 0.5 | 2.0 | 2.7 | 0.2 | 1.0 | 2.6 |
| | $Na_2O$ | 0.21 | 0.24 | 0.24 | 0.22 | 0.23 | 0.2 | 0.4 |
| | $K_2O$ | 0.62 | 0.54 | 0.54 | 0.56 | 0.55 | 0.6 | 0.4 |
| | $Li_2O$ | 0.5 | 0.55 | 0.55 | 0.5 | 0.5 | 0.48 | 0.48 |
| | $Fe_2O_3$ | 0.42 | 0.42 | 0.42 | 0.42 | 0.42 | 0.42 | 0.42 |
| | $TiO_2$ | 0.35 | 0.3 | 0.4 | 0.3 | 0.3 | 0.4 | 0.6 |
| Ratio | C1 | 0.91 | 0.82 | 1.0 | 0.96 | 0.80 | 0.86 | 1.1 |
| | C2 | 1.25 | 1.27 | 1.22 | 1.36 | 1.27 | 1.28 | 1.16 |
| Parameter | Forming temperature/° C. | 1274 | 1276 | 1279 | 1280 | 1278 | 1277 | 1278 |
| | Liquidus temperature/° C. | 1192 | 1194 | 1190 | 1196 | 1193 | 1194 | 1193 |
| | ΔT/° C. | 82 | 82 | 89 | 84 | 85 | 83 | 85 |
| | Peak crystallization temperature/° C. | 1034 | 1026 | 1039 | 1023 | 1028 | 1025 | 1035 |
| | Refractive index | 1.569 | 1.568 | 1.570 | 1.570 | 1.566 | 1.568 | 1.570 |
| | Young's modulus/GPa | 89.3 | 90 | 89.5 | 88.7 | 88.9 | 89.1 | 89 |

TABLE 1-continued

| | | A1 | A2 | A3 | A4 | A5 | A6 | A7 |
|---|---|---|---|---|---|---|---|---|
| Crystallization status | Type of Crystal phase and diffraction intensity ratio | Diopside and anorthite 1:0.45 | Diopside and anorthite 1:0.5 | Diopside and anorthite 1:0.45 | Diopside and anorthite 1:0.55 | Diopside and anorthite 1:0.5 | Diopside and anorthite 1:0.5 | Diopside and anorthite 1:0.4 |
| | Main crystal phase appearance | Crystal grains show poor crystallinity, needle-like shapes, small sizes and disorderly arrangement. | Crystal grains show poor crystallinity, needle-like shapes, small sizes and disorderly arrangement. | Crystal grains show low crystallinity, needle-like shapes, small sizes and disorderly arrangement. | Crystal grains show poor crystallinity, needle-like shapes, small sizes and disorderly arrangement. | Crystal grains show poor crystallinity, needle-like shapes, small sizes and disorderly arrangement. | Crystal grains show poor crystallinity, needle-like shapes, small sizes and disorderly arrangement. | Crystal grains show poor crystallinity, needle-like shapes, small sizes and disorderly arrangement. |

TABLE 2

| | | A8 | A9 | A10 | A11 | Boron-free E glass | Traditional R glass | Improved R glass |
|---|---|---|---|---|---|---|---|---|
| Component | $SiO_2$ | 61.3 | 60.6 | 59.4 | 60.4 | 60 | 60 | 60.75 |
| | $Al_2O_3$ | 15.4 | 15.4 | 17.0 | 15.6 | 13.57 | 25 | 15.80 |
| | CaO | 11.3 | 11.0 | 11.2 | 11.5 | 22.46 | 9 | 13.90 |
| | MgO | 8.7 | 9.5 | 9.05 | 8.95 | 2.81 | 6 | 7.90 |
| | SrO | 1.0 | 1.3 | 1.05 | 1.25 | 0 | 0 | 0 |
| | $Na_2O$ | 0.21 | 0.25 | 0.4 | 0.24 | 0.27 | trace amount | 0.73 |
| | $K_2O$ | 0.36 | 0.47 | 0.43 | 0.53 | 0.32 | trace amount | |
| | $Li_2O$ | 0.81 | 0.46 | 0.55 | 0.51 | 0 | 0 | 0.48 |
| | $Fe_2O_3$ | 0.42 | 0.42 | 0.42 | 0.42 | 0.29 | trace amount | 0.18 |
| | $TiO_2$ | 0.4 | 0.5 | 0.4 | 0.5 | 0.2 | trace amount | 0.12 |
| Ratio | C1 | 0.85 | 1.0 | 0.9 | 0.88 | 0.12 | 0.66 | 0.57 |
| | C2 | 1.29 | 1.15 | 1.23 | 1.28 | 7.99 | 1.5 | 1.75 |
| Parameter | Forming temperature/° C. | 1268 | 1279 | 1280 | 1278 | 1270 | 1430 | 1278 |
| | Liquidus temperature/° C. | 1188 | 1191 | 1194 | 1191 | 1190 | 1350 | 1210 |
| | ΔT/° C. | 80 | 88 | 86 | 87 | 80 | 80 | 68 |
| | Peak crystallization temperature/° C. | 1043 | 1033 | 1030 | 1036 | / | 1010 | 1016 |
| | Refractive index | 1.569 | 1.568 | 1.567 | 1.569 | 1.564 | 1.561 | 1.563 |
| | Young's modulus/GPa | 89.4 | 88.7 | 89.3 | 89.1 | 81 | 91 | 87.5 |
| Crystallization status | Type of Crystal phase and diffraction intensity ratio | Diopside and anorthite 1:0.5 | Diopside and anorthite 1:0.4 | Diopside and anorthite 1:0.45 | Diopside and anorthite 1:0.5 | Wollastonite and anorthite — | Diopside and anorthite 1:0.8 | Diopside and anorthite 1:0.6 |
| | Main crystal phase appearance | Crystal grains show poor crystallinity, needle-like shapes, small sizes and disorderly arrangement. | Crystal grains show low crystallinity, needle-like shapes, small sizes and disorderly arrangement. | Crystal grains show poor crystallinity, needle-like shapes, small sizes and disorderly arrangement. | Crystal grains show poor crystallinity, needle-like shapes, small sizes and disorderly arrangement. | / | Crystal grains show complete crystallinity, rod-like shapes, bigger sizes and orderly arrangement. | Crystal grains show complete crystallinity, rod-like shapes, bigger sizes and orderly arrangement. |

It can be seen from the values in the above tables that, compared with the traditional R glass and the improved R glass, the glass fiber composition of the present invention has the following advantages: (1) much lower liquidus temperature, which helps to reduce crystallization risk and increase the fiber drawing efficiency; (2) relatively high peak crystallization temperature, which indicates that more energy is needed for the formation and growth of crystal nucleuses during the crystallization process of glass, i.e. the crystallization risk of the glass of the present invention is smaller under the same conditions; (3) The crystal phases show less complete crystallinity, relatively small crystal grain size and disorderly arrangement, which indicate that the crystallization degree of the glass of the present invention is lower, thereby further reducing crystallization risk; in addition, the examples which meet the preferred ranges of both the ratios C1 and C2 have more significantly improved effects, and (4) significantly improved glass refractive index. At the same time, compared with the improved R glass, the glass fiber composition of the present invention has higher modulus, which indicates that the compact stacking structure achieved by the designed ternary alkali earth effect of the present invention has a greater effect on improving the mechanical properties of the glass. In addition, compared with the mainstream boron-free E glass, the crystallization performance and forming performance of the glass fiber composition of the present invention are similar and meet the requirements of large-scale high-efficiency production with refractory-lined furnaces.

It can be seen from the above that the glass fiber composition of the present invention has breakthrough progress in improving the crystallization performance and in the refractive index of the R glass-grade glasses, has greatly reduced crystallization risk and significantly increased refractive index under the same conditions. In addition, the crystallization performance and fiberizing performance of the overall technical solution are similar to those of the mainstream boron-free E glass and enables easy achievement of large-scale high-efficiency production with a direct-melt process in a refractory-lined furnace.

The glass fiber composition according to the present invention can be used for making glass fibers having the aforementioned excellent properties.

The glass fiber composition according to the present invention in combination with one or more organic and/or inorganic materials can be used for preparing composite materials having excellent performances, such as glass fiber reinforced base materials.

Finally, what is should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by the phrase "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The glass fiber composition of the present invention not only ensures that the glass fiber has high mechanical properties and low forming temperature, but also overcomes the issue of too high liquidus temperature and too high rate of crystallization in traditional high-performance glasses which lead to high tendency to crystallization and difficulty to achieve large-scale high-efficiency production, significantly decreases the liquidus temperature of high performance glass, increases the glass crystallization peak temperature, decreases the degree of glass crystallization under the same conditions and, meanwhile, has an outstanding glass refractive index which greatly improves transparency of glass fiber-reinforced articles.

The invention claimed is:

1. A glass fiber composition, comprising the following components expressed as percentage by weight:

| | |
|---|---|
| $SiO_2$ | 58-64% |
| $Al_2O_3$ | 14-19% |
| CaO | ≥8.8% and <11.8% |
| MgO | 7.5-11% |
| SrO | 0.2-2.7% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

wherein, the range of the weight percentage ratio C1=(MgO+SrO)/CaO is 0.75-1.1 and the range of the weight percentage ratio C2=CaO/MgO is less than 1.4.

2. The glass fiber composition according to claim 1, wherein the range of the weight percentage ratio C2=CaO/MgO is greater than 1 and less than 1.3.

3. The glass fiber composition according to claim 1, wherein the range of the weight percentage ratio C1=(MgO+SrO)/CaO is 0.8-1.

4. The glass fiber composition according to claim 1, wherein the content of CaO expressed as percentage by weight is greater than 10.5% and less than 11.8%.

5. The glass fiber composition according to claim 1, comprising the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

wherein, the weight percentage ratio C1=(MgO+SrO)/CaO is 0.75-1.1, and the range of the weight percentage ratio C2=CaO/MgO is less than 1.4.

6. The glass fiber composition according to claim 1, comprising the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

wherein, the range of the weight percentage ratio C1=(MgO+SrO)/CaO is 0.8-1, and the range of the weight percentage ratio C2=CaO/MgO is greater than 1 and less than 1.3.

7. The glass fiber composition according to claim 1, comprising the following components expressed as percentage by weight:

| | |
|---|---|
| $SiO_2$ | 59-61.5% |
| $Al_2O_3$ | 14.5-16.5% |
| CaO | 10.6-11.7% |
| MgO | 8-10% |
| SrO | 0.5-2% |
| $Na_2O + K_2O$ | 0.1-1% |
| $Li_2O$ | 0.05-0.7% |
| $Fe_2O_3$ | 0.05-0.7% |
| $TiO_2$ | 0.05-0.8% |
| $F_2$ | <0.5% |

wherein, the range of the weight percentage ratio C1=(MgO+SrO)/CaO is 0.8-1, and the range of the weight percentage ratio C2=CaO/MgO is greater than 1 and less than 1.3.

8. A glass fiber being produced from the glass fiber compositions described in claim 1.

9. The glass fiber of claim 8, wherein the range of the weight percentage ratio C2=CaO/MgO is greater than 1 and less than 1.3, and the range of the weight percentage ratio C1=(MgO+SrO)/CaO is 0.8-1.

10. The glass fiber of claim 8, wherein the content of CaO expressed as percentage by weight is greater than 10.5% and less than 11.8%.

11. The glass fiber of claim 8, comprising the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

wherein, the weight percentage ratio C1=(MgO+SrO)/CaO is 0.75-1.1, and the range of the weight percentage ratio C2=CaO/MgO is less than 1.4.

12. The glass fiber of claim 8, comprising the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

wherein, the range of the weight percentage ratio C1=(MgO+SrO)/CaO is 0.8-1, and the range of the weight percentage ratio C2=CaO/MgO is greater than 1 and less than 1.3.

13. The glass fiber of claim 8, comprising the following components expressed as percentage by weight:

| | |
|---|---|
| $SiO_2$ | 59-61.5% |
| $Al_2O_3$ | 14.5-16.5% |
| CaO | 10.6-11.7% |
| MgO | 8-10% |
| SrO | 0.5-2% |
| $Na_2O + K_2O$ | 0.1-1% |
| $Li_2O$ | 0.05-0.7% |
| $Fe_2O_3$ | 0.05-0.7% |
| $TiO_2$ | 0.05-0.8% |
| $F_2$ | <0.5% |

wherein, the range of the weight percentage ratio C1=(MgO+SrO)/CaO is 0.8-1, and the range of the weight percentage ratio C2=CaO/MgO is greater than 1 and less than 1.3.

14. A composite material incorporating the glass fiber described in claim 8.

15. The composite material of claim 14, wherein the range of the weight percentage ratio C2=CaO/MgO is greater than 1 and less than 1.3, and the range of the weight percentage ratio C1=(MgO+SrO)/CaO is 0.8-1.

16. The composite material according to claim 14, wherein the content of CaO expressed as percentage by weight is greater than 10.5% and less than 11.8%.

17. The composite material according to claim 14, comprising the following components expressed as percentage by weight:

| | |
|---|---|
| $SiO_2$ | >59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

wherein, the weight percentage ratio C1=(MgO+SrO)/CaO is 0.75-1.1, and the range of the weight percentage ratio C2=CaO/MgO is less than 1.4.

18. The composite material according to claim 14, comprising the following components expressed as percentage by weight:

| | |
|---|---|
| $SiO_2$ | 59-62% |
| $Al_2O_3$ | 14.5-18% |
| CaO | >10.5% and <11.8% |
| MgO | 8-10.5% |
| SrO | 0.5-2% |
| $Na_2O + K_2O$ | 0.1-2% |
| $Li_2O$ | 0.05-0.9% |
| $Fe_2O_3$ | 0.05-1% |
| $TiO_2$ | 0.05-1.1% |
| $F_2$ | <0.5% |

wherein, the range of the weight percentage ratio C1=(MgO+SrO)/CaO is 0.8-1, and the range of the weight percentage ratio C2=CaO/MgO is greater than 1 and less than 1.3.

19. The composite material according to claim 14, comprising the following components expressed as percentage by weight:

| | |
|---|---|
| $SiO_2$ | 59-61.5% |
| $Al_2O_3$ | 14.5-16.5% |
| CaO | 10.6-11.7% |
| MgO | 8-10% |
| SrO | 0.5-2% |

-continued

| | |
|---|---|
| $Na_2O + K_2O$ | 0.1-1% |
| $Li_2O$ | 0.05-0.7% |
| $Fe_2O_3$ | 0.05-0.7% |
| $TiO_2$ | 0.05-0.8% |
| $F_2$ | <0.5% |

wherein, the range of the weight percentage ratio C1=(MgO+SrO)/CaO is 0.8-1, and the range of the weight percentage ratio C2=CaO/MgO is greater than 1 and less than 1.3.

* * * * *